ered Patent Office 2,982,579
Patented May 2, 1961

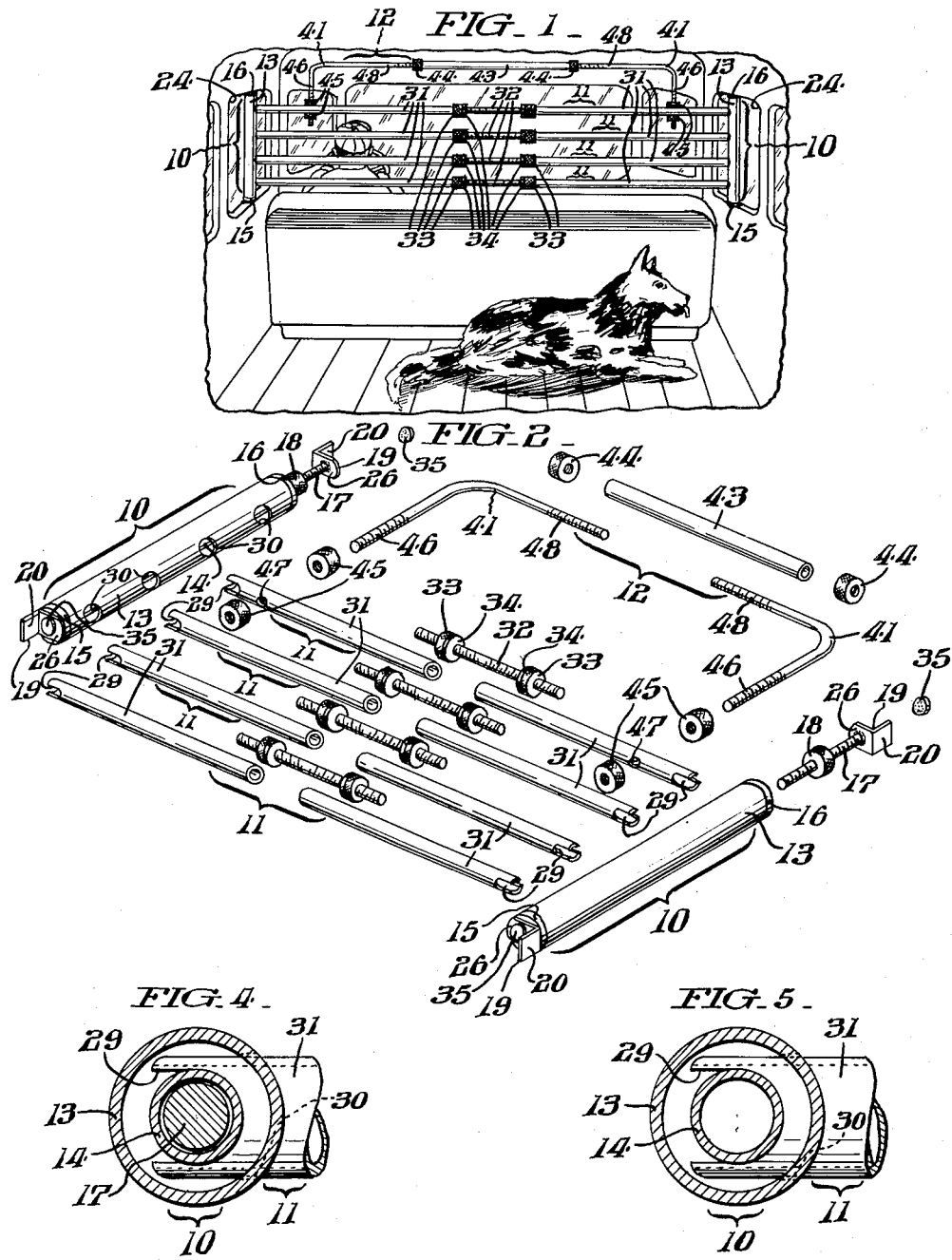

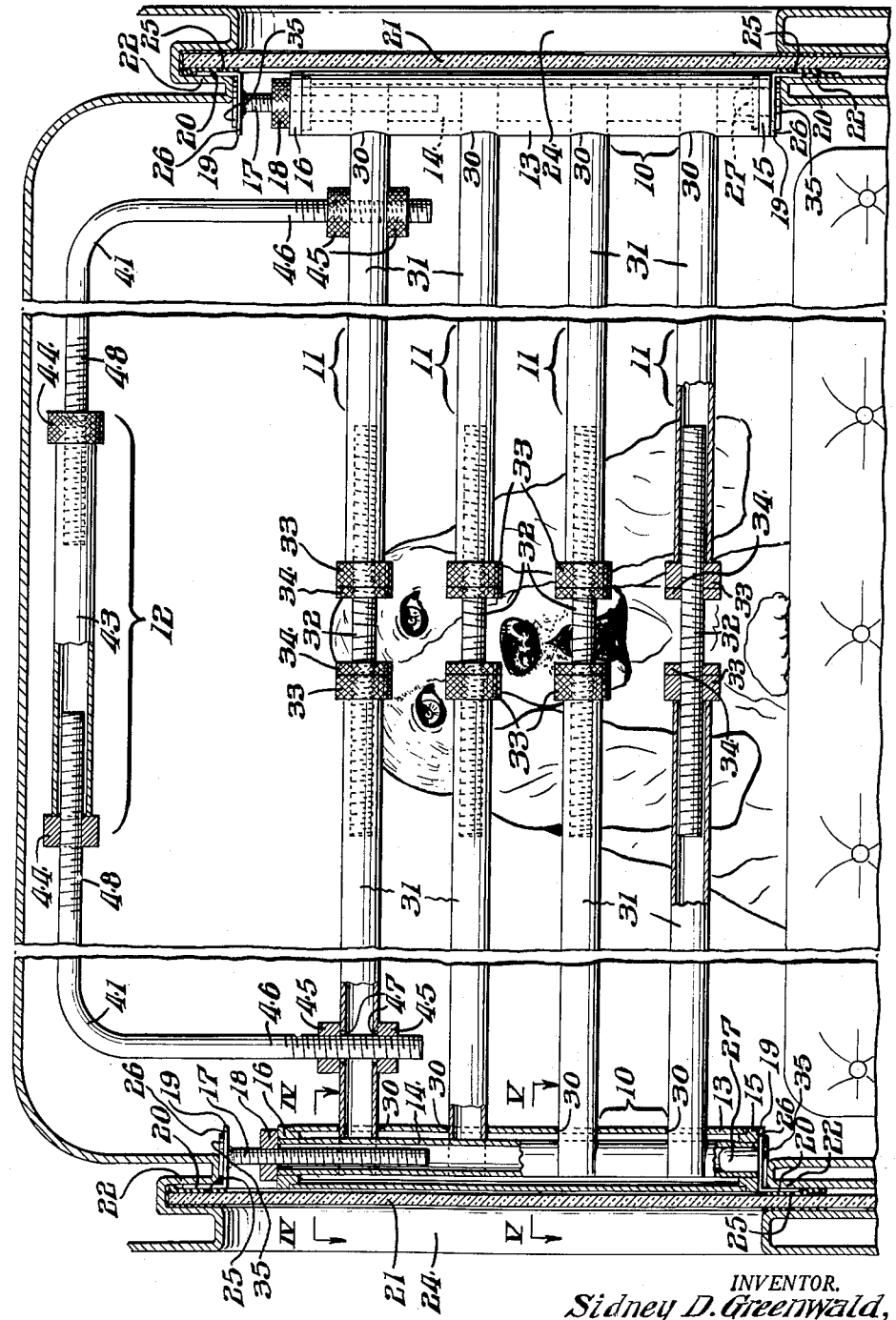

2,982,579

ADJUSTABLE AND REMOVABLE PARTITIONING DEVICE FOR AUTOMOBILES

Sidney D. Greenwald, P.O. Box 12, Meadowbrook, Pa.

Filed Mar. 19, 1958, Ser. No. 722,433

5 Claims. (Cl. 296—24)

This invention relates to an adjustable and removable partitioning device or barrier for automobiles and more particularly to such a device for confining dogs, other animals, or children in a specific area in an automobile. Many sportsmen, show enthusiasts and animal lovers dislike using confining crates for the transport of animals, which are difficult to handle, and further, on purely economic grounds such crates are objectionable on the ground of excessive expense. By properly partitioning an automobile such as a station wagon, a comfortable area can be provided without unduly confining the animal. It is important when transporting a dog for show or work purposes that the dog arrive at its destination in a rested condition and ready for show or work. It is, therefore, desirable to transport the dog so that the intimate relation of master and dog is fully preserved instead of subjecting the dog to the shock of complete separation from its master or custodian.

Such a device is also needed to take care of the daily situation where a dog rides in his master's automobile. A substantial safety hazard is caused by the jumping of the dog on or around the driver of the automobile. When the dog has the free run of the entire car, mud, dirt and hairs are tracked over the entire car, its contents and its occupants. In traveling with dogs in automobiles, there is a constant problem in motels or lodges where no dogs are allowed. This situation could be easily met if a dog could be simply left in the vehicle overnight in complete comfort in familiar surroundings. Working dogs will prefer the back of a station wagon to a steam heated motel room. In spite of these long recognized difficulties in the transportation and handling of dogs in automobiles, the art has failed to recognize the long standing need for a partitioning means which would solve all the above difficulties. Safety bars and road bracing structures have been provided in automobiles as well as safety partitions between the front and rear seats to protect the driver from attack, but nothing is available for the adequate handling of dogs in automobiles. Accordingly, one of the objects of this invention is to provide an adjustable and removable partition or barrier for segregating a portion of the interior of an automobile to accommodate an animal or child.

Another object of this invention is to provide an economic, rugged and simple structure which will function as such a partition. These, together with other objects and advantages of this invention, will become apparent from the following description of a specific form of this invention, reference being had to the accompanying drawings forming a part hereof.

Fig. 1 is a fragmentary showing in perspective of the interior of an automobile equipped with the barrier of this invention, looking from the back seat forward toward the driver's seat.

Fig. 2 is an exploded drawing showing the component parts of this invention in suggested relation to each other.

Fig. 3 is a front view of this invention in place between the sides of an automobile which is only partially shown.

Fig. 4 is a sectional view taken about the lines IV—IV of Fig. 3.

Fig. 5 is a sectional view taken about the lines V—V of Fig. 3.

In describing the preferred embodiment of the invention illustrated in the drawing, specific terminology will be resorted to for the sake of clarity. However, it is not the intention to be limited to the specific terms so selected, and it is to be understood that each specific term includes all technical equivalents which operate in a similar manner to accomplish a similar purpose.

In Fig. 1 there is shown a partial interior view of a station wagon equipped with the barrier of this invention showing how a dog is comfortably restrained in the rear portion of the station wagon. It will be noted that the barrier may be installed behind the front or middle seat. This effectively prevents the dog from jumping into the front or middle seat with the driver or passengers and yet does not prevent a normal relation of companionship between the driver and the dog. It is obvious that other windows in the automobile can be adjusted for ventilation without providing an escape for the animal. For the purposes of a detailed description of this specific embodiment of the invention the barrier may be analyzed into two vertical side members comprehensively designated as 10, a plurality of transverse bars comprehensively designated as 11, and an adjustable U-shaped top bar comprehensively designated as 12. The adjustable side members 10 are tubular in shape and comprise an outer tube 13, an inner tube 14, a bottom plug 15, a top cap 16, an adjustment rod 17 in threaded engagement with adjustment nut 18, and angles 19 mounted at each end of the side member 10. The vertical plate 20 of each angle 19 extends into operative engagement with the window frames 24 of the automobile by projecting into the space between the glass 21 of the window and the frame portion 22. As shown in Fig. 3 it will be noticed that the conventional gasket 25 has been forced out against the window glass 21 by the vertical plate 20 of the angle 19, which protects the glass 21 from the possibility of being scratched by the angle 19 but the angle 19 could also project into the space between the glass 21 and the gasket 25 without affecting the operation of the barrier itself. In certain automobiles it may be easier to effect the engagement of the angles 19 with the window frame by spreading the gasket 25 away from the window frame as shown in Fig. 3, but in other automobiles it may be easier to insert the angle 19 between the gasket 25 and the window glass 21 with the possible risk of scratching the glass 21. Sponge rubber discs 35 are provided on the angles 19 to prevent marring of the window frame. These discs may be cemented to the plates 26 of the angles 19 by any appropriate cementing composition. The horizontal plates 26 of the angles 19 are in abutting relation with the upper and lower portions of the window frame which is comprehensively designated as 24.

The bottom plug 15 and top cap 16 are identical in shape and each is formed with a shoulder for seating in the outer tube 13 with a forced fit and with a circular center bore. The ends of the inner tube 14 are seated with a forced fit in the center bores of the plug 15 and top cap 16. The stud 27 which is mounted by welding on the angle 19 projects into the bottom end of the inner tube 14 with a forced fit. The threaded adjustment rod 17 projects down into the inner tube 14 through the center bore in the cap 16 so that the adjustment nut 18 abuts with the top of the cap 16. On top of the adjustment rod 17 an angle 19 is mounted by welding. It will be seen from this detailed description that the side member 10 can be extended in operable length by rotation of the nut 18 so that different sized automobile windows can be accommodated in the operation of this invention. While the construction of this side member 10 has been described in some detail, it will be obvious to those skilled in the art that other structural forms and variations of assembling means are available.

The transverse bars 11 have bifurcations 29 formed on each end thereof. These bifurcations 29 are given a rounded shape interiorly to engage the outer surface of the inner tubes 14 by projection through holes 30 in the side members 10. These holes 30 are larger in diameter than the bars 11 which permits limited angular adjustment between the side members 10 and the transverse bars 11 where the windows and sides of the automobile are inclined inwardly from the vertical.

The transverse bars 11 consist of two parts 31 freely joined by a threaded adjustment rod 32 projecting into each of said members 31. Mounted on the adjustment rod 32 are nuts 33 with lock nuts 34. It will be seen that when the transverse bar 11 is in place between the side members 10 that the nuts 33 are in abutting relation with the inner ends of the elements 31 of the transverse bars 11. The lock nuts 34 perform their usual function in regard to the nuts 33 and thus insure that the barrier will not become loose or disassembled while in use from the vibration of the automobile.

Since this barrier is designed to accommodate various types of automobiles it is necessary to provide for a varying space between the top of an automobile and the highest transverse bar 11 in the assembly. For this purpose a U-shaped adjustable top bar 12 has been provided. This top bar 12 consists of two members 41 threaded at the ends thereof and adjustment sleeve 43 and adjustment nuts 44 and 45. The bottom ends 46 of the top bar 12 project through spaced vertical holes 47 formed in the upper transverse bar 11 and are locked in engagement at the desired height therewith by nuts 45. The upper ends 48 of the members 41 are locked into engagement with the adjustment sleeve 43 by means of nuts 44.

The assembling and disassembling operation of this invention will be obvious from the above detailed description of the structure above and no tools of any sort are needed. It has been found convenient to first position the side members in the windows selected in the automobile adjacent to the front seat or middle seat with which the barrier is to be used. The bifurcated ends 29 of the transverse bars 11 may then be inserted through the holes 30 in side members 10 and the nuts 33 rotated so that they are in firm abutting relation with the inner ends of the members 31 of the transverse bars 11. The lock nuts 34 are then operated as usual. The top bar 12 is then mounted on the upper or highest of the transverse bars 11 and adjusted in place by the manipulation of nuts 44 and 45. Since the long component parts of this invention are so easily reduced to short lengths, the whole apparatus in its disassembled condition lends itself to easy storage. It has been found desirable to use aluminum in the construction of this barrier since it is rustproof, rugged and harmonizes with the interior of present day automobiles but of course the invention is not limited to any specific material.

While the preferred embodiment of this invention has been described in some detail, it will be obvious to one skilled in the art that various modifications may be made without departing from the invention as hereinafter claimed.

Having thus described my invention, I claim:

1. A transverse barrier for a vehicle comprising longitudinally adjustable side members removably attachable to the sides of a vehicle, and a plurality of longitudinally adjustable transverse bars in engagement with said side members, wherein said side members comprise an outer tube member having holes formed therein to receive the ends of said transverse bars, and an inner tube member spaced away from said outer tube member and said transverse bars are slotted at the ends thereof to embrace said inner tube members.

2. The invention of claim 1 characterized further by the fact that each of said transverse bars comprises two tubular elements, an intermediate threaded adjustment rod extending into said tubular elements and adjustment nuts in threaded engagement with said rod and in abutting relation with opposing ends of said tubular elements.

3. The invention of claim 2 characterized further by the fact that lock nuts are provided in operative relation with said adjustment nuts.

4. The invention of claim 1 characterized further by the fact that said side members have angle members mounted on the ends thereof for operatively engaging the sides of said vehicle at the window frames thereof.

5. The invention of claim 4 characterized further by the fact that each of said side members includes a threaded adjustment rod having an adjustment nut in abutting contact with an end of said side member when a portion of said adjustment rod is in telescopic engagement with said member, the outer end of said adjustment rod having one of said angle members mounted thereon.

References Cited in the file of this patent

UNITED STATES PATENTS

| | | |
|---|---|---|
| 1,064,130 | Conlin | June 10, 1913 |
| 2,514,466 | Bildhauer | July 11, 1950 |
| 2,543,175 | Kilgore | Feb. 27, 1951 |
| 2,546,929 | Nampa | Mar. 27, 1951 |
| 2,565,997 | Stone | Aug. 28, 1951 |
| 2,720,414 | Hart | Oct. 11, 1955 |
| 2,755,525 | Minot | July 24, 1956 |
| 2,799,530 | Drake | July 16, 1957 |
| 2,803,471 | Roth | Aug. 20, 1957 |

FOREIGN PATENTS

| | | |
|---|---|---|
| 866,173 | Germany | Feb. 9, 1953 |